July 13, 1926.
J. W. MILLARD
1,592,037
AUTOMOBILE LOCK
Filed Sept. 12, 1922     2 Sheets-Sheet 1
FIG. I.
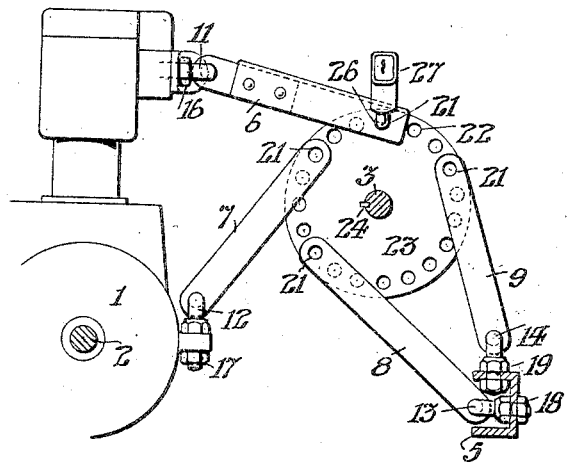
FIG. II.
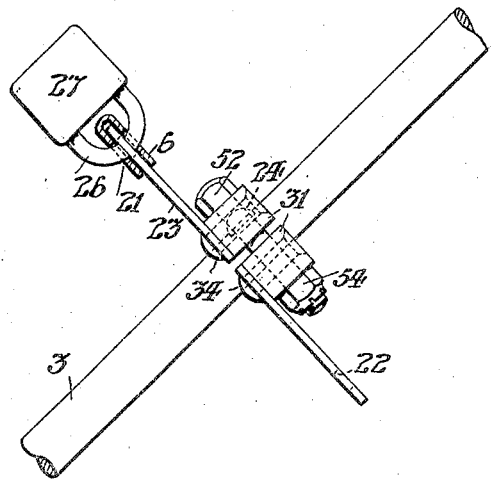
Inventor:
JOHN WARREN MILLARD

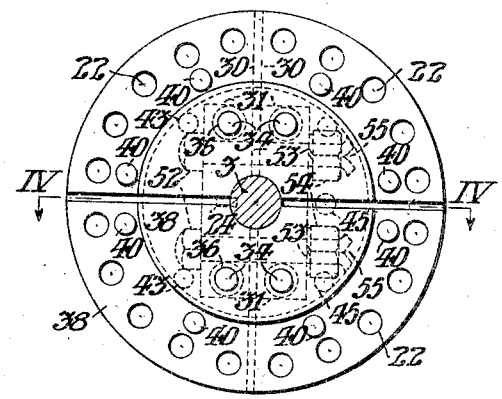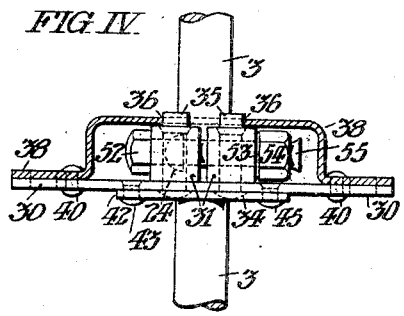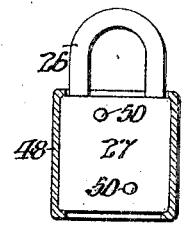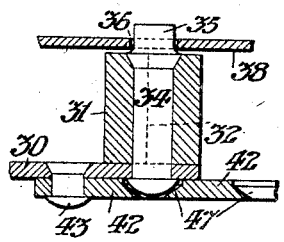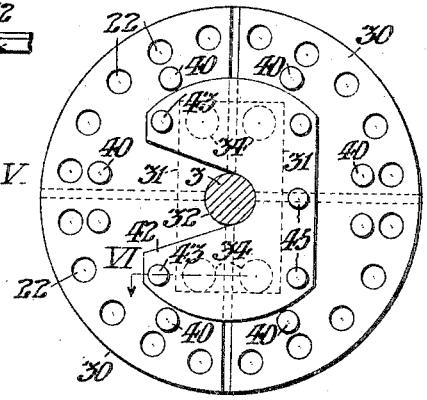

Patented July 13, 1926.

1,592,037

UNITED STATES PATENT OFFICE.

JOHN WARREN MILLARD, OF UPPER DARBY, PENNSYLVANIA.

AUTOMOBILE LOCK.

Application filed September 12, 1922. Serial No. 587,684.

It is an object of my invention to provide simple locking means which may be applied to any motor vehicle having an exposed steering post shaft. As hereinafter described; my invention includes the combination with such an exposed shaft; of a locking disk, primarily split transversely to its axis and having one or more lock holes extending through it, parallel with its axis, and a pair of jaws adapted to clamp said shaft; said jaws being connected, in such clamping position, by screw bolts and nuts having means to prevent them from being released; one of said jaws having a keyway engaging a key seated in said shaft; a link, securely pivoted to some stationary portion of the vehicle, and having at its free end a hole adapted to register with such a lock hole in said disk; and a padlock adapted to detachably connect said disk and link through said lock holes. In the form of my invention hereinafter described; said disk is reinforced by another, which I term the drum, which is dished to form a cup-shaped recess to contain said jaws and is primarily split transversely to its axis; said two disks being riveted together with their respective split portions in transverse relation to each other, and said first disk being further reinforced by a yoke plate which straddles said shaft and is riveted to both sections of said first disk upon opposite sides of the split portion thereof; whereby said disk may be rigidly and immovably connected with said shaft, after the latter is assembled in its vehicle; so that devices constructed in accordance with my invention may be sold as accessories to be applied by owners of such vehicles after the latter are otherwise completed. However, it is to be understood that locking means constructed in accordance with my invention as hereinafter claimed, may be embodied in motor vehicles, in the course of primary construction of the latter. Moreover, I prefer to employ padlocks which, in addition to the ordinary construction and arrangement of such locks, are provided with an armor casing, rendering the lock more resistant to felonious attack.

My invention includes the various novel features of construction and arrangement hereinafter more definitely specified.

In said drawings: Fig. I is a fragmentary sectional elevation of parts of an automobile showing a form of my invention applied thereto.

Fig. II is a fragmentary sectional elevation of the left-hand side of the steering post shaft and its appurtenances, indicated in Fig. I, but on a larger scale.

Fig. III is a plan view of a modified form of my invention.

Fig. IV is a fragmentary diametrical sectional view of said form of my invention shown in Fig. III, taken on the line IV, IV.

Fig. V is an inverted plan view of said form of my invention shown in Figs. III and IV.

Fig. VI is a fragmentary sectional view, full size, taken on the line VI in Fig. V.

Fig. VII is a side elevation of my improved padlock, showing its armor partly in section.

Fig. VIII is an end view of said padlock with its armor.

Referring to Fig. I; 1 is the motor of the vehicle, conveniently an internal combustion engine having the tail shaft 2, and 3 is the steering post shaft, extending in a plane parallel with said shaft 2 but inclined with respect to the axis of said shaft 2, in the usual manner. Said motor 1 is rigidly connected with and supported by the chassis frame of which the side member 5 is a part. Keeper links 6, 7, 8 and 9 are respectively permanently pivotally connected to fulcrum bearings 11, 12, 13 and 14, on axes parallel with said steering shaft. I find it convenient to form said bearings as bolts which may be rigidly connected with respective stationary parts of the vehicle structure by respective nuts 16, 17, 18 and 19. Each of said keeper links 6, 7, 8 and 9 has, at its free end, a lock hole 21 adapted to register with a corresponding hole or holes 22 eccentrically located in the locking disk 23 which, in the form of my invention shown in Fig. I, is a unitary piece encircling said steering post shaft 3 and rigidly connected therewith by the key 24 so that, when the hasp 26 of the pad lock 27 is inserted through the registered lock holes 21 and 22 of any one of said keeper links; said steering post shaft 3 is thus held stationary and rendered inoperative, to prevent theft or unauthorized use of the vehicle thus equipped. However, when said lock 27 is removed, said shaft 3 is freed to be operated in the ordinary way.

Although such a locking disk as exemplified at 23 may be applied to any portion of an exposed steering post shaft, either in front or back of the vehicle dash board; it is less conspicuous if attached beneath an automobile hood, and the latter location has the additional advantage that the hood may also be locked to prevent unauthorized access to the locking disk and its appurtenances.

Although I have referred to the attachment of said disk to an exposed portion of a steering post shaft; it is to be understood that the other portions of such a shaft may be surrounded by a stationary tube either in front of or behind the dash board.

In the form of my invention shown in Figs. III to VI inclusive; I have found it convenient to provide a locking disk 30 which is primarily split transversely to its axis to form oppositely counterpart semi-annular sections, and has one or more lock holes 22 extending through it, parallel with its axis; said holes being conveniently arranged in a circular series, as shown in Fig. V. Each of said sections of the disk 30 is provided with a clamping jaw block 31, rigidly connected therewith and having a semicylindrical seat 32 for clamping engagement with said shaft 3. I find it convenient to rigidly connect said jaw blocks 31 with said sections 30 by means of rivets 34 secured therein, as best shown in Fig. VI. The inner ends 35 of said rivets 34 are extended to form dowels which fit in corresponding holes 36 in the semiannular sections of the disk 38, which I term the drum, which is dished to form a cup-shaped recess to contain said jaw blocks 31 and is primarily split transversely to its axis; said disk 30 being reinforced by riveting said two disks together with their respective split portions in transverse relation to each other, conveniently by the circular series of rivets 40.

I also prefer to further reinforce said disk 30 by means of the yoke plate 42 which straddles said shaft 3, as best shown in Fig. V and is riveted to both sections of said disk 30, by respective rivets 43 and 45. As best shown in Fig. VI, said yoke plate 42 has pockets 47 formed in it to receive the rounded heads of said rivets 34 and thus prevent access thereto.

As indicated in Figs. VII and VIII; I prefer to provide said padlock 27 with an armor casing 48, conveniently formed of a piece of primarily cylindrical steel tubing of suitable diameter, which is partly collapsed and bent to the form best shown in Fig. VIII; and then has its ends clinched over the body of said lock to render the latter more resistant to felonious attack than if not thus protected. Such an armor casing may be employed with particular advantage to shield a padlock body of the type formed of two oppositely counterpart sections which are intended to be permanently connected by rivets 50 and which may, otherwise, be attacked by splitting such lock body sections apart with a chisel or drawing out the rivets.

The form of my invention shown in Figs. III to VI inclusive may be readily applied to a previously assembled motor vehicle, as follows: The clamp blocks 31 are secured upon the steering shaft 3, conveniently by means of bolts 52 fitted through corresponding holes in said blocks, as indicated in Figs. III and IV, and provided with spring washers 53 and nuts 54; the ends of said bolts being bifurcated, conveniently by diametrically saw-cutting them, so that they may be spread apart, like cotter pins, as best shown at 55 in Fig. III, to thus lock said nuts 54 in clamped position, with a hole 22 in a disk section 30 in such position as to register with the hole 21 in one of said keeper links 6, so that when the lock 27 is applied, said shaft 3 is held in the desired stationary position.

Although said disk 30 may be thus securely frictionally engaged with the shaft 3; I prefer to provide the key 24 engaging said shaft and one of said clamp blocks 31, to supplement such frictional engagement by positive connection of said parts. If such a key is to be employed; the clamp blocks and their respective disk sections may be initially removably clamped on said shaft merely to determine the desired position thereof, which may be marked on said shaft. Thereupon, said clamp blocks may be removed and a key way cut in the shaft to engage said key 24, and said clamp blocks be then permanently engaged with said shaft and the bifurcated ends 55 of said bolts 52 be spread as shown in Fig. III, to lock the nuts 54.

Said yoke plate 42 is then fitted astride said shaft 3, as indicated in Fig. V, and rigidly connected with the two half sections of said disk 30 by means of the five rivets 43 and 45, to cover and protect the heads of the rivets 34 as above described.

Thereupon, the two halves of the disk 38 may be placed in the position shown in the drawings, with the split portion thereof at right angles to the split portion of said disk 30, and said disks be permanently connected by the rivets 40. Of course, said disk 38 serves to protect said bolts 52 and nuts 54 from being tampered with. Said disk 38 has lock holes 22 registered with the lock holes 22 in said disk 30, as indicated.

I prefer to form said disks 30 and 38 and their appurtenances above described, including the keeper links and the fulcrum bearings for the latter, of metal which may be through hardened or case hardened, to prevent cutting or breaking the same. However, I do not desire to limit myself to the use of such metal as said parts may be made sufficiently massive to resist attack even if unhardened, and it is unnecessary to harden the disks if the keeper links are made of hard metal in the U-shaped channel form shown in Figs. I and II; for such form secludes and protects the engaged portion of the disk 23 from felonious attack.

As far as I am aware; it is broadly new to provide a pivoted keeper link, connected with a stationary part of a vehicle, as means to prevent the operation of the steering mechanism of a vehicle, without limitation to the combination of such a link with a disk which is split to facilitate its connection with a steering post shaft. Therefore, I do not desire to limit myself to the precise details of construction and arrangement herein set forth, as it is obvious that various modifications may be made therein without departing from the essential features of my invention, as defined in the appended claims.

I claim:

1. Means adapted for locking a motor vehicle steering shaft in inoperative position, including a link pivoted upon a fulcrum bearing adapted to be secured in stationary position upon said vehicle; a locking disk, primarily split transversely and having a circular series of lock holes extending through it, parallel with its axis; a pair of jaw blocks, respectively rigidly connected with the sections of said disk and adapted to oppositely engage said shaft; bolts connecting said jaw blocks upon respectively oposite sides of said shaft, and having their ends bifurcated; nuts engaging said bolts with said jaws rigidly engaging said shaft; said bifurcated ends of said bolts being spread to prevent removal of said nuts; and lockable means adapted to detachably connect the free end of said link with said disk.

2. Means adapted for locking a motor vehicle steering shaft, in inoperative position, including a link adapted to be pivoted upon a stationary portion of said vehicle; a locking disk, primarily split transversely and fitted together upon said shaft; a yoke plate straddling said shaft; means rigidly connecting said yoke plate with the sections of said disk, with the latter rigidly connected with said shaft; and lockable means adapted to detachably connect the free end of said link with said disk.

3. Means adapted for locking a motor vehicle steering shaft, in inoperative position, including a link adapted to be pivoted upon a stationary portion of said vehicle; a locking disk, primarily split transversely, and fitted together upon said shaft; means retaining said disk in rigid relation with said shaft, including another disk, primarily split transversely, and fitted together upon said shaft; means rigidly connecting said disks; and lockable means adapted to detachably connect the free end of said link with said disks.

4. Means adapted for locking a motor vehicle steering shaft, in inoperative position, including a link adapted to be pivoted upon a stationary portion of said vehicle; a locking disk, primarily split transversely, and fitted together upon said shaft; means retaining said disk in rigid relation with said shaft, including another disk, primarily split transversely, and fitted together upon said shaft; means rigidly connecting said disks; said disks having a circular series of lock holes extending through them parallel with their common axis; and lockable means adapted to detachably connect the free end of said link with said disks, including a padlock having a hasp fitted to selectively engage said lock holes.

5. Means adapted for locking a motor vehicle steering shaft, in inoperative position, including a link adapted to be pivoted upon a stationary portion of said vehicle; a locking disk, primarily split transversely, and fitted together upon said shaft; means retaining said disk in rigid relation with said shaft, including a pair of jaw blocks, respectively rigidly connected with the sections of said disk, and having rivet stud projections, and adapted to oppositely engage said shaft; bolts connecting said jaw blocks upon respectively opposite sides of said shaft, and having their ends bifurcated; nuts engaging said bolts with said jaws rigidly engaging said shaft; said bifurcated ends of said bolts being spread to prevent removal of said nuts; a yoke plate straddling said shaft; means rigidly connecting said yoke plate with the sections of said disk; another disk, primarily split transversely, and fitted upon said shaft; said second disk having a hollow drum portion adapted to inclose said jaw blocks, and holes adapted to register with and receive said rivet stud ends; means rigidly connecting said disks; said disks having a circular series of lock holes extending through them parallel with their common axis; a Whitworth key engaging said shaft and one of said jaw blocks and preventing relative rotation of said shaft and disks; and a padlock having a hasp fitted to selectively engage said lock holes, and adapted to detachably connect the free end of said link with one of said disk lock holes.

6. Means adapted for locking a motor vehicle steering shaft, in inoperative position, including a link adapted to be pivoted upon a stationary portion of said vehicle; a locking disk, primarily split transversely, and fitted together upon said shaft; means retaining said disk in rigid relation with said shaft, including a pair of jaw blocks, respectively rigidly connected with the sections of said disk, having stud projections, and adapted to oppositely engage said shaft; bolts connecting said jaw blocks upon respectively opposite sides of said shaft; nuts engaging said bolts with said jaws rigidly engaging said shaft; means normally preventing removal of said nuts; a yoke plate straddling said shaft; means rigidly connecting said yoke plate with the sections of said disk; another disk, primarily split transversely, and fitted upon said shaft; said second disk having a hollow drum portion adapted to inclose said jaw blocks, and holes adapted to register with and receive said stud ends; means rigidly connecting said disks; said disks having a circular series of lock holes extending through them parallel with their common axis; means preventing relative rotation of said shaft and disks; and a padlock having a hasp fitted to selectively engage said lock holes, and adapted to detachably connect the free end of said link with one of said disk lock holes.

7. Means adapted for locking a motor vehicle steering shaft, in inoperative position, including a link adapted to be pivoted upon a stationary portion of said vehicle; a locking disk, primarily split transversely, and fitted together upon said shaft; means retaining said disk in rigid relation with said shaft, including bolts extending upon respectively opposite sides of said shaft, and having their ends bifurcated; nuts engaging said bolts with said jaws rigidly engaging said shaft; said bifurcated ends of said bolts being spread to prevent removal of said nuts; another disk, primarily split transversely, and fitted upon said shaft; said second disk having a hollow drum portion adapted to inclose said bolts and nuts; means rigidly conecting said disks; said disks having a circular series of lock holes extending through them parallel with their common axis; means preventing relative rotation of said shaft and disks; and a padlock having a hasp fitted to selectively engage said lock holes, and adapted to detachably connect the free end of said link with one of said disk lock holes.

8. Means adapted for locking a motor vehicle steering shaft, in inoperative position, including a link adapted to be pivoted upon a stationary portion of said vehicle; a locking disk, primarily split transversely, and fitted together upon said shaft; means retaining said disk in rigid relation with said shaft, including a yoke plate straddling said shaft; means rigidly connecting said yoke plate with the sections of said disk; another disk, primarily split transversely, and fitted upon said shaft; means rigidly connecting said disks; said disks having registered lock holes extending through them parallel with their common axis; and a padlock having a hasp fitted to selectively engage said lock holes, and adapted to detachably connect the free end of said link with said disks.

9. Means adapted for locking a motor vehicle steering shaft, in inoperative position, including a link adapted to be pivoted upon a stationary portion of said vehicle; a locking disk, primarily split transversely, and fitted together upon said shaft; means retaining said disk in rigid relation with said shaft; another disk, primarily split transversely, and fitted upon said shaft; means rigidly connecting said disks; said disks having registered lock holes extending through them parallel with their common axis; and a padlock having a hasp fitted to selectively engage said lock holes, and adapted to detachably connect the free end of said link with said disks.

In testimony whereof, I have hereunto signed my name at Philadelphia, Pennsylvania, this seventeenth day of August, 1922.

JOHN WARREN MILLARD.